Figure 2:
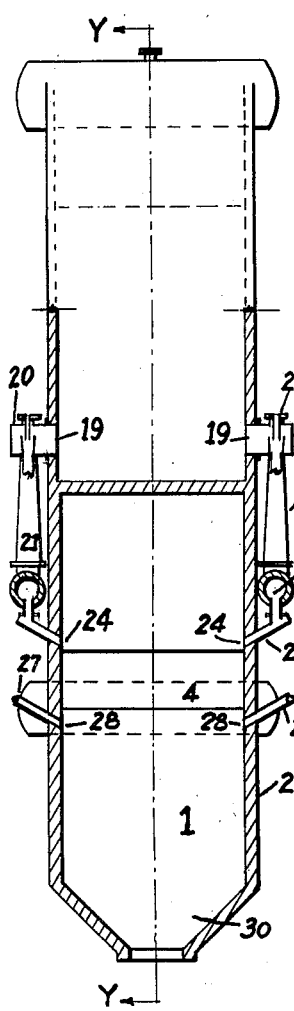

Feb. 20, 1951     H. N. SIMPSON     2,542,060
METHOD OF RECOVERING CHEMICALS FROM LIQUOR PRODUCED
BY PULPING OF CELLULOSIC MATERIALS
Filed Jan. 2, 1945

Herman N. Simpson INVENTOR.
BY Cook & Robinson
ATTORNEYS

Patented Feb. 20, 1951

2,542,060

UNITED STATES PATENT OFFICE 2,542,060

METHOD OF RECOVERING CHEMICALS FROM LIQUOR PRODUCED BY PULPING OF CELLULOSIC MATERIALS

Herman N. Simpson, Seattle, Wash.

Application January 2, 1945, Serial No. 571,102

15 Claims. (Cl. 23—48)

1

This invention relates to a new and improved method for the recovery of chemicals from the liquor produced in the extraction of fibers or pulp from cellulosic materials, particularly wood in the form of chips.

In the separation and extraction of fibers, or so-called pulp, from cellulosic materials, particularly wood in the form of chips, the cellulosic material is held in intimate contact under heat and pressure with solutions of either alkaline or acid nature, depending on the characteristics desired in the finished pulp. Under this action, the lignin or other binding substance in the cellulosic material also goes into solution as a complex organic compound of the alkaline or acid solution used, producing what is known in the pulp industry and to those acquainted with the art of pulp making, as a "black liquor." In the case of the calcium base sulphite process, the complex organic compounds formed are calcium-lignosulphonates.

In order to recover the chemicals in the so-called black liquor, particularly for reuse of these chemicals in preparing new solutions for the process used, it is necessary to separate the organic and lignin matter from the chemicals, both of which are in more or less complete solution. Such separation is ordinarily done in the alkaline pulping process by evaporating the water or liquid in the black liquor, until the solution contains enough solids of the organic and lignin nature, compared to the amount of water still remaining, that the concentrated black liquor will, under proper conditions, in a furnace of proper design, be capable of supporting the combustion of the organic and lignin matter, and will leave in the furnace, or in the gases therefrom, the chemicals it is desired to reclaim. These chemicals will be in the form of an infusible ash, or in a molten or fused condition, capable of flowing out of the furnace if proper means are provided for this flow to occur. If an ash is the result of such a burning operation, means must be provided to remove such ash from the furnace space and from the gases that result. It is practical and economical to remove the solids and valuable vapors in the gases, no matter from what process the black liquor is produced.

Before the organic and lignin matter in the concentrated black liquor can ignite and be burned in a furnace, the remaining water or liquid in which the organic and lignin matter occurs, must be evaporated. There are several established ways in which this is now done, such as by spraying into or by atomizing the black

2 liquor within the furnace, or by splashing it in a definite manner onto the furnace walls. In all of these methods, ascending hot gases from the combustion occurring on the furnace floor or above it, are passed through the liquor streams and adjacent to the liquor surface where this liquor adheres to the furnace walls, thus completing the drying operation, preparatory to the organic and lignin matter igniting and burning. The flow of the black liquor from any type of burner as above described, is directed in such a manner as to be at substantially right angles to, or substantially opposed to the flow of hot gases arising from the furnace. This causes particles of black liquor to be carried in suspension by the gas stream and these particles cause considerable trouble by depositing on the tubes and other surfaces of a boiler and other heat absorbing equipment usually associated with a chemical recovery furnace.

In my present process, which pertains more particularly to the acid pulping process as distinguished from the alkaline pulping process, the preferred manner of introducing the black liquor is to atomize it, or introduce it in some other manner, into the furnace, at or near the top, along with substantially all or most of the required air of combustion heated up to a range of 300° F. to 500° F., in such a manner that the atomized black liquor and air flow in a general downward direction, and, as gas, pass out of the furnace through openings in one or more walls of the furnace, such an opening being above the bottom portion of the furnace in such location that the flow of resulting gas must make what is substantially a 180° turn to enter the gas outlet passage. In this preferred manner, the final drying of the concentrated black liquor, if such is atomized as stated, occurs in suspension in the furnace space. Also the igniting and burning of the organic and lignin matter takes place, more or less completely in suspension, allowing the chemical either to fall to the floor of the furnace in a partially fused or completely fused condition, or in a dry condition and also partly carried in suspension in the gas flow. Just what conditions exist will depend on the nature of the chemical solution used originally to extract the organic and lignin matter from the cellulosic material, particularly wood in the form of chips.

In the pulping process known to the pulp industry and those acquainted with the art of making pulp, as the sulphite pulp process, cellulosic materials, particularly wood in the form of chips are "cooked" with an acid known in the industry as calcium base sulphite acid. This acid is made in one way by absorbing sulphur dioxide gas in water flowing over the surface of lime rock, placed in a tower at the bottom of which the gas enters. This is known as the tower method. The acid can also be made by absorbing the sulphur dioxide gas in a suspension of hydrated lime in water. This is known as the milk of lime system. Other methods exist of absorbing the sulphur dioxide gas. Instead of lime, magnesium hydrate or milk of magnesium can also be used in preparing the acid for cooking the wood chips, but magnesium alone is not now in general use. However, both calcium and magnesium can be associated together, either naturally as dolomite or a hydrate of dolomite limestone, or can be blended together for the purpose of making the "cooking" acid without interfering with the working of the process.

The recovery of chemicals for reuse in the process of making sulphite pulp, has up to the present time not been very successful, except for a partial recovery of the sulphur in the form of sulphur dioxide gas. The acid black liquor resulting from the process of cooking cellulosic materials, particularly wood chips, is difficult to handle because it is a fairly strong acid, and must be handled and confined in acid proof materials. Up to the present time sulphite pulp black liquor has been difficult to evaporate in any manner, particularly in a multiple effect evaporator, because it is acid, and also because of the plugging and scaling of the evaporator tubes with calcium compounds, particularly calcium sulphate, which deposits out very quickly when liquid is evaporated from the black liquor. The calcium sulphate deposits out because it is highly insoluble and has an inverted solubility characteristic; that is, it is less soluble in hot liquid than in a cold liquid.

In order to remove the acid characteristics of the black liquor resulting from the sulphite pulping of wood chips, or other cellulosic materials, the black liquor can be alkalyzed or neutralised with a solution or suspension containing the oxide or hydrate of the "base" metal used for originally making the acid. In the case of calcium bisulphite black liquor alkalyzed or neutralised with a milk of lime solution, a precipitate is formed. This precipitate is separated from the black liquor, which can be subsequently processed as black liquor of a neutral or alkaline character and capable of being handled and confined in vessels which do not need to be acid resisting.

One of the best reasons, however, for not recovering the chemicals used in the calcium base bisulphite pulping of wood, resides in the fact that up to the present time in separating the organic and lignin matter from the chemicals by burning out the organic and lignin matter, the resulting chemical left as an ash or collected out of the gas stream, has contained a large amount of calcium sulphate which is insoluble in sulphur dioxide gas absorbed in water, and consequently is not usable in the process. It has therefore been the practice to allow the black liquor to be discarded or go to the sewer, polluting any body of water or basin into which the sewer empties, creating a public nuisance and a hazard.

By the use of a magnesium base instead of a calcium base in the making of the cooking liquor, it is possible to recover the chemicals for reuse in the making of new or fresh organic and lignin matter from the chemicals, by burning away the organic and lignin matter, the resulting chemical ash is substantially all magnesium oxide, the same magnesium compound as originally used in making the acid solution used for cooking the cellulosic material, particularly wood in the form of chips.

If the resulting chemicals left behind as an ash or collected from the gas stream after the burning of calcium bisulphite black liquor can be obtained in the form of calcium oxide, similar to what occurs when magnesium bisulphite black liquor is burned, leaving behind magnesium oxide as an ash, then there will be no need to discard the calcium bisulphite black liquor as a waste product. Nor will it be necessary for a sulphite pulp producer to change over to the so-called "magnesium base" sulphite pulping process, in place of his present "calcium base" sulphite pulp process. This would be a great advantage to sulphite pulp producers making pulp by the so-called "calcium base" sulphite pulp process.

It is the main object of this invention to describe a method and apparatus for the recovery of chemicals from the black liquor produced by the pulping process of cellulosic materials, particularly wood in the form of chips. A further object of this invention is to describe a method and apparatus for the recovery of chemicals from the black liquor produced particularly from the pulping process known as the sulphite pulp process, in which the cooking liquor is known to those conversant with the art, as calcium base bisulphite acid. The invention is not to be understood as limited in application to the calcium base bisulphite pulping process, but is also applicable to the magnesium base bisulphite pulping process, or any other bisulphite process using an alkaline earth metal as a base of the process. Portions of the invention are also applicable to the sulphate pulping process and to the soda pulping process.

As previously stated, it is a fact that up to the present time, in the attempts made to recover, for reuse in making new or fresh cooking liquor, all of the inorganic chemicals from the black liquor from the so called calcium base bisulphite pulping process by burning away the organic and lignin matter from the inorganic chemicals which are recoverable partly as ash, the remainder as sulphur dioxide gas, the chemical compound partly recovered as ash has been largely, though not entirely, calcium sulphate. This is not suitable for reuse in the making of calcium base bisulphite acid for the cooking operation. In order to be capable of reuse the chemical compound recovered as the ash part must be calcium oxide. It is the purpose of this invention to show that by careful control of the operation of burning the organic and lignin matter out of the black liquor produced from the calcium base bisulphite process, and by other means, as described below, that the chemical compound recovered as the ash portion, can be made to be calcium oxide almost entirely, with little other chemical compound, particularly calcium sulphate.

It is a matter of record, that in the decomposition of calcium sulphate by heat, decomposition sets in about 500° centigrade. At this temperature there is a partial decomposition of the calcium sulphate to calcium sulphide—especially in the presence of carbon. This reaction in the presence of carbon is $CaSO_4 + 4C = CaS + 4CO$. Above 850° centigrade calcium sulphide or CaS, reacts with any remaining calcium sulphate to form calcium oxide, CaO, and sulphur dioxide, $SO_2$. The complete decomposition of calcium sulphate, CaSO₄, at this temperature is hindered by the reaction $CaS+2SO_2=CaSO_4+2S$. At a temperature over 1,000° centigrade in the decomposition of calcium sulphate it is possible to obtain lime or CaO completely free, or practically so, of any calcium sulphate compound, for beginning at a temperature above 1,000° centigrade the following reaction takes place, $$2CaS+SO_2=2CaO+3S$$

By being able under proper conditions to decompose calcium sulphate, CaSO₄, and calcium sulphide, CaS, to calcium oxide and sulphur and burning this to sulphur dioxide, it will be apparent to those acquainted with the art of making sulphite pulp by the calcium base process, that the complete or nearly complete recovery of the chemicals, both those of the calcium base such as calcium oxide, and sulphur as such or as sulphur dioxide, used in this process, can be effected by means well established in the industry.

The proper conditions necessary so that the reaction of calcium sulphide and sulphur dioxide to form calcium oxide and sulphur the reaction $2CaS+SO_2=2CaO+3S$, can take place in a so called recovery furnace, can be created. It is the purpose of this invention to show how this can be done, and to those acquainted with the art of sulphite pulp manufacture it will be readily apparent. It is not necessary to limit the use of this invention to any particular design, kind or make of furnace or retort although it may work better in one make than in another. It is only necessary to be able to create those conditions under which the above reactions take place. These conditions in the furnace are:

1. The creation of initial temperature zones at temperatures lower than 850° centigrade and a zone or region in the furnace, or adjacent thereto, at a temperature, the minimum of which should be 850° centigrade, the maximum over 1500° centigrade, and maintained continuously at this higher temperature.

2. The simultaneous presence in this higher temperature zone, of the particles of calcium sulphide, CaS, which have resulted from the prior reduction of calcium sulphate, CaSO₄, by the burning of the organic and lignin or carbonaceous matter of the black liquor.

3. The simultaneous presence in this higher temperature zone of sufficient sulphur dioxide gas, SO₂, to complete the reaction of calcium sulphide, CaS, to calcium oxide, CaO, and sulphur, S.

4. In or immediately beyond this temperature zone sufficient oxygen to completely burn any sulphur, S, to sulphur dioxide gas, SO₂, and any carbon C, or carbon monoxide, CO, to carbon dioxide CO₂.

As stated above a temperature zone, in or adjacent to the furnace, above 850° centigrade is necessary for the beginning of the reaction desired. The proportions of water, chemicals and organic lignin matter in the concentrated black liquor fired into the furnace, will influence the resulting temperatures within the furnace, when the organic lignin matter burns. The less water in the black liquor as it is fired into the furnace, the higher will be the temperatures attainable. This is a desirable condition for the fulfilling of this invention. It is therefore desirable to concentrate the black liquor so as to have a minimum amount of water or liquid before the black liquor is fired into the furnace. In fact the black liquor can be completely dried to a more or less powdered form. The proportion of water, chemicals and lignin matter should be but not necessarily limited to this condition such that the amount of water does not exceed fifty percent of the total weight of black liquor as it is fired into the furnace.

It is one of the objects of this invention to show how it is possible in any design or make of a so called chemical recovery furnace—or a furnace retort used for this purpose, to create the conditions previously indicated as being necessary for the full attainment of the objects of this invention. One method, but not the only method, is by the recirculation back to the furnace or temperature zone of a portion of the furnace gases, or a portion of the gases which have already left the furnace. Such gas contains sulphur dioxide, SO₂ at a high temperature, and the recirculation of this gas will be the means of assisting in, if not entirely, maintaining a temperature zone in the furnace or adjacent thereto, above 850° centigrade. At the same time the sulphur dioxide, SO₂, gas thus recirculated will assist, if not entirely, then in part, in satisfying the condition that sulphur dioxide, SO₂, gas must be simultaneously present in the above mentioned zone to effect the reaction desired namely, $2CaS+SO_2=2CaO+3S$. The recirculation of a part of the furnace gases, or a part of the gases which have already left the furnace can be done with existing types and makes of hot gas circulating equipment, actuated by steam, air, gas, or other means. It is important only to this invention that the recirculation takes place.

The correct amount of sulphur dioxide gas to satisfy the reaction required, provided there is not sufficient sulphur dioxide, SO₂, gas in the gases recirculated as above described, can be obtained by introducing at the proper place in the furnace, from a separate source, the proper amount of such sulphur dioxide, SO₂, gas. Such a separate source could be the sulphur burner found in every sulphite pulp mill, or from a storage of sulphur dioxide gas. Such storage could be a tank or commercial cylinders used for the purpose.

Another means of obtaining the required amount of sulphur dioxide, SO₂, gas to satisfy the reaction is to mix sulphur with the black liquor prior to the black liquor being fired into the furnace. Still another way is to introduce sulphur itself directly into the furnace either adjacent to the point where the black liquor is fired, or at some other point or points in the furnace. It is to be understood that the introduction of additional sulphur in any form or compound is not limited to any particular manner or by any particular means, so long as the sulphur in the form of sulphur dioxide, SO₂, gas will be introduced in the reaction zone of the furnace, to satisfy the reaction required to take place.

Figure 1:
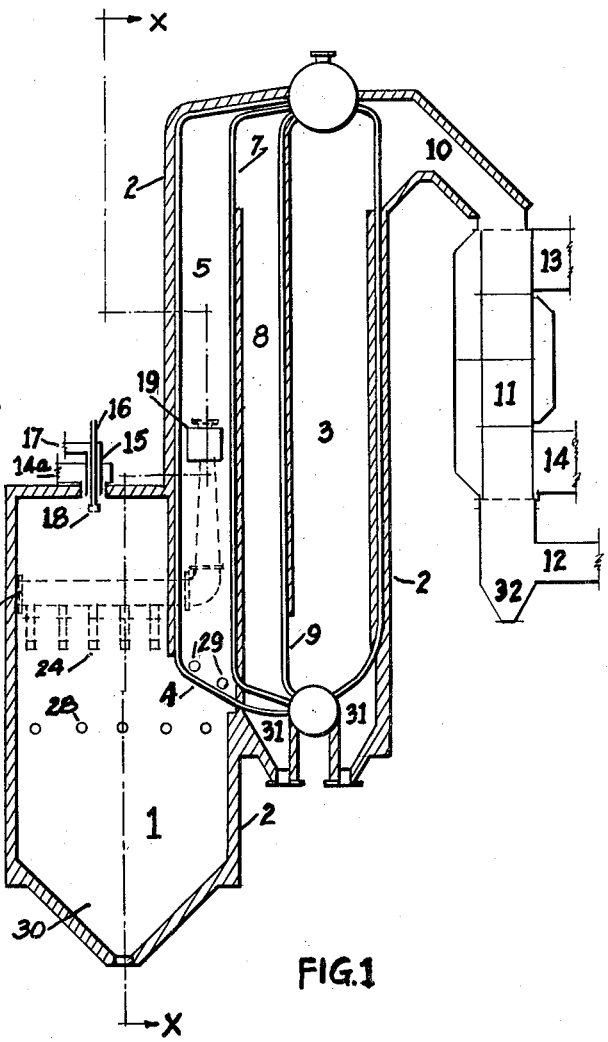

The accompanying drawings illustrate somewhat schematically an apparatus for carrying out the method according to the present invention. Fig. 1 shows a vertical section of the furnace chamber, the accompanying waste heat boiler and air heater and the burner on the line Y—Y of Fig. 2. Fig. 2, is a section on the line X—X of Fig. 1 and shows more clearly the gas recirculating apparatus and air pipes but omits most of the boiler parts shown more clearly in Fig. 1.

The apparatus schematically illustrated in the drawings by way of example, comprises a furnace chamber 1 which is shown as having refractory material walls 2. The furnace walls could also be provided with so called water walls without exceeding the scope of the invention but for the purpose of this disclosure the walls are shown composed only of refractory materials. Attached to the furnace and made a part thereof is a steam boiler 3 for absorbing the heat generated in the furnace or within the boiler itself. Gases from the furnace enter the boiler through an opening 4 in a furnace wall, across which opening is a row of tubes of the boiler, which tubes form a screen. Gases pass up in the up flue 5 whose walls are composed of boiler tubes and refractory materials. In the illustration there are no tubes other than those forming the walls of this up flue. However, other tubes such as boiler tubes or super heater tubes could be included without exceeding the scope of this invention. The gases then pass through an opening 7 across which there is a row of boiler tubes forming a screen into a down flue 8. The walls of this down flue are composed of tubes and refractory materials. In the illustration there are no tubes in this down flue other than the tubes in the walls. However, other tubes such as boiler tubes or superheater tubes could be included without exceeding the scope of this invention. At the bottom of this down flue the gases enter the bank of tubes forming the boiler 3 through an opening 9. The boiler setting is enclosed with refractory materials 2. After passing upward along the boiler tubes the gas leaves the boiler proper and enters a duct 10 through which duct the gases are conducted to the top of an air heater 11. The gas leaves the air heater at the bottom through a duct 12 and from here passes on through collectors and other apparatus for the absorbing of heat and chemical and then passes on to the stack. Equipment beyond the air heater gas outlet is not shown in the drawings. Cool air enters the air heater through the inlet duct 13 and leaves heated at the bottom through the outlet duct 14.

At the top of the furnace on its center line is the burner assembly 15 consisting of a central pipe 16 surrounded by a duct 17 and a hot air duct 14a which is a continuation of the hot air outlet duct 14 at the bottom of the air heater 11. The central pipe 16 of the burner assembly is capable of conducting singly or in combination fuel oil or other liquid fuel, or black liquor from which the organic and lignin matter is to be burned, to the burner tip 18 through which the fuel under pressure atomizes into the furnace chamber.

In the side walls of the up flue 5 at a selected location there are openings 19. Into these openings there are inserted castings 20 forming the upper end of a gas blower 21 the lower end of which discharges into a gas header 22 out of which a plurality of pipes 23 conduct gas through openings 24 into the furnace chamber 1 at a selected level. Gas from a separate source can also be connected to one end 25 of the gas header 22 and into the furnace, and can also be connected to duct 17 of the burner assembly 15. At the top of the gas blower 21 is a jet apparatus with an inlet 26. Into this inlet is connected a source of steam, air or other gas under pressure for actuating the gas blower for moving a portion of the hot gases out of the up flue 5 and discharging these gases into the header 22 and into the furnace through the pipes 25 and furnace wall openings 24. While the drawings thus show a gas blower consisting of a jet actuated apparatus it is to be understood that other forms of gas moving apparatus such as a fan could be used without exceeding the scope of this invention.

Located in the side walls of the furnace chamber 1 in its lower part are pipes 27. These pipes normally are used to conduct hot air from a continuation of hot air duct 14 located at the bottom of the air heater 11 into the furnace chamber through openings 28. However these pipes can be used to conduct gas as well, or can be used as inlets for the burning of oil or gas or other fuel at this level in the furnace. Additional openings such as 28 can be added still lower in the furnace than those shown in the drawings, even down to the level of the dust or ash hopper bottom 30 without exceeding the scope of this invention. Openings 29 shown only in Fig. 1 in the side wall of the boiler setting just beyond the screen tubes are for the express purpose of conducting air or gas into the beginning of up flue 5.

Under the boiler and built into the boiler setting are dust hoppers 31 to catch what dust or fly ash will fall out of the gas flow as the gas travels through the boiler. Similarly under the air heater is a hopper 32 to catch dust out of the gas stream at this point. Beyond the gas outlet duct 32 there will have to be additional equipment to catch dust still carried in the gas stream. Such equipment can be commercial forms of collectors. Also there will have to be equipment for scrubbing out of the gas, the valuable $SO_2$ gas for the purpose of reclaiming this gas for making fresh acid for cooking purposes. This equipment is not shown on the drawings.

In placing the furnace into operation suitable fuel oil-gas-coal-or wood is burned in furnace to heat the furnace to an initial temperature. Air for the combustion of this fuel can be introduced at the burner through duct 14 or through ducts 23 or pipes 27. When it is observed that the furnace is sufficiently hot, the black liquor is ready to introduce into the furnace through nozzle 18.

The black liquor has been previously evaporated or concentrated so that it contains not more than 50% water—preferably less—to a point where it is ready to be atomized from the burner nozzle 18. At the same time hot air is introduced into duct 14a. Immediately on leaving the nozzle the black liquor dries by evaporation of the remaining water content. The organic and lignin matter in the atomized particles ignite and burn and continue to fall in the furnace chamber. The burning of the organic and lignin matter produces considerable heat and generates a large volume of gas and the inorganic chemical particles attain the approximate temperature of the surrounding gas. By this time the particles of burning material have reached a level in the furnace approximately opposite openings 24 through which, if necessary, a flow of hot gases extracted from the up flue through openings 19 can be passed to intimately mingle with the burning particles surrounding them with an atmosphere containing $SO_2$ gas. As the particles of burning material continue to fall they encounter air introduced through openings 28. This air completes combustion of the organic and lignin matter and produces a temperature above a minimum of 850 degrees centigrade, and produces the proper temperature conditions to fulfill the requirements of this invention.

A part of the inorganic chemical falls as ash into the hopper 30 from which the ash can be removed. The balance of the chemical particles are carried along with the gas stream out of the furnace and into and through the boiler and air heater to the gas outlet 12. In this passage a part of the remaining chemical drops out as ash in hoppers 31 and 32 and the balance leaves the air heater carried in suspension in the gas stream. The solids that leave with the gas stream can be caught in centrifugal cyclones in an established manner and the gas can be scrubbed with water or a milk or lime solution or other alkaline solution to reclaim the valuable $SO_2$ gas. Or the cool gas can be conducted immediately to the base of a so called acid tower and introduced to the tower in exactly the same manner as gas from a sulphur burner is now introduced for the making of acid for the cooking of the cellulosic materials particularly wood in the form of chips.

To assist in maintaining proper temperatures in the furnace fuel, preferably oil or gas from a separate source can be fired into the furnace either through the burner assembly itself and duct 17 or through separate burners installed for the purpose. The drawings do not show these separate burners.

Having thus described my invention, I make certain claims, as follows:

1. The method of recovering chemicals from black liquor that is produced in the pulping of cellulosic materials by the calcium base sulphite pulp process which comprises creating in a furnace, an upper treating zone of a temperature between 500° C. and 850° C., and a lower zone in direct communication therewith of from 850° C. to 1500° C., discharging the black liquor in an atomized condition along with air to support combustion, downwardly into the upper zone to cause evaporation of the water therein, the ignition of the organic and lignin matter and the reaction of the calcium ligno-sulphonates to produce, along with other products, calcium sulphide and sulphur dioxide, and introducing sulphur dioxide gas into the lower zone in an amount required to complete reaction therein of the calcium sulphide, to calcium oxide and other products.

2. The method of recovering chemicals from black liquor that is produced in the pulping of cellulosic materials by the calcium base sulphite pulp process which comprises creating in a furnace, an upper treating zone of a temperature between 500° C. and 850° C., and a lower zone in direct communication therewith of from 850° C. to 1500° C., discharging the black liquor in an atomized condition along with air to support combustion, downwardly into the upper zone to cause evaporation of the water therein, the ignition of the organic and lignin matter and the reaction of the calcium-ligno-sulphonates and carbon to produce, along with other products, calcium sulphide and sulphur dioxide, and introducing sulphur dioxide gas into the lower zone in an amount required to complete reaction therein of the calcium sulphide, to calcium oxide and other products, and the introduction of air sufficient to burn any residual sulphur to sulphur dioxied.

3. The method of recovering chemicals from black liquor that is produced in the pulping of cellulosic materials by the calcium base sulphite pulp process which comprises introducing the black liquor into a zone of furnace heat of a temperature to effect the evaporation of the water therein and the incident ignition of the organic and lignin matter and the reaction of the calcium ligno-sulphonates to produce along with other products, calcium sulphide and sulphur dioxide, and by the burning of the ignited matter, to create a second zone of heat in which the calcium sulphide and sulphur dioxide can react to produce calcium oxide along with sulphur, the introduction of air to burn the sulphur to sulphur dioxide gas and the circulation back to the beginning of the second zone of furnace heat of a portion of the final gases containing sulphur dioxide.

4. The method of recovering chemicals from black liquor that is produced in the pulping of cellulosic materials by the calcium base sulphite pulp process which comprises creating in a furnace, an upper treating zone of a temperature between 500° C. and 850° C. and a lower zone in direct communication therewith of from 850° C. to 1500° C., discharging the black liquor in an atomized condition along with air to support combustion downwardly into the upper zone to cause evaporation of the water therein, the ignition of the organic and lignin matter and the reaction of the calcium-ligno-sulphonates to produce along with other products, calcium sulphide and sulphur dioxide and introducing sulphur dioxide gas into the lower zone in an amount required to complete reaction therein of the calcium sulphide to calcium oxide and sulphur and the introduction of air sufficient to burn any residual sulphur to sulphur dioxide gas, the circulation back to the beginning of the lower zone of a portion of the final gases containing sulphur dioxide and the absorption in scrubbing towers of the remainder of the final gases.

5. The method of recovering chemicals from black liquor that is produced in the pulping of cellulosic materials by the calcium base sulphite process, comprising flowing the dispersed black liquor and air through an introductory furnace zone maintained at such temperature that water is evaporated from the liquor and ignition of the organic matter and reaction of the calcium compounds is effected, continuing the flow into a second zone maintained at a higher temperature of reaction such that the reaction between calcium sulphide and sulphur dioxide is effected to produce calcium oxide and other products, and inducing a draft from the first into the said second zone by withdrawing gases from the latter at a point below the first zone in flow separated from flow in said first zone.

6. A method of recovering chemicals from black liquor as recited in claim 5, including also the introduction of heated air with the dispersed liquor and inducing a draft in said second and lower zone by withdrawing gases therefrom substantially below said first zone in flow separated from the flow in said first zone.

7. A method of recovering chemicals from black liquor as recited in claim 5 including also the introduction with the dispersed liquor of air heated within a range of from 300° F. to 500° F. to support combustion, and inducing a draft in said second and lower zone by withdrawing gases therefrom substantially below said first zone in flow separated from the flow in said first zone.

8. The method of recovering chemicals from black liquor that is produced in the pulping of cellulosic materials by the calcium base sulphite process, comprising flowing the dispersed black liquor along with air to support combustion downwardly into an introductory zone maintained at a temperature between 500° C. and 850° C. to cause evaporation of water from the liquor ignition of the organic matter and reaction of the calcium compounds and without encountering induced upward draft, continuing the flow into a second and lower zone in direct communication therewith maintained at a temperature from 850° C. to 1500° C. such that the reaction between calcium sulphide and sulphur dioxide is effected to produce calcium oxide along with other products, inducing a draft in said second and lower zone by withdrawing gases therefrom substantially below said first zone in flow separated from the flow in said first zone.

9. The method of recovering chemicals from black liquor is produced in the pulping of cellulosic materials by the calcium base sulphite pulp process, comprising evaporating the water in the black liquor to produce substantially dry solids, flowing the dried solids and air to support combustion into an introductory furnace zone maintained at a temperature not above 850° C. to ignite the organic matter and effect the reaction of the calcium compounds and continuing the flow into a second furnace zone maintained at a higher temperature of reaction such that the reaction between calcium sulphide and sulphur dioxide is effected to produce calcium oxide and other products, inducing a draft in said second furnace zone by withdrawing gases therefrom in flow separated from the flow in said first zone.

10. The method of recovering chemicals from black liquor that is produced in the pulping of cellulosic materials by the calcium base sulphite pulp process, comprising evaporating the water in the black liquor to produce substantially dry solids, flowing the dried solids and air to support combustion downwardly through an introductory furnace zone maintained at a temperature not exceeding 850° C. to ignite the organic matter and effect the reaction of the calcium compounds and without encountering induced upward draft, continuing the flow into a second and lower zone maintained at a temperature above 850° C. such that the reaction between calcium sulphide and sulphur dioxide is effected to produce calcium oxide and other products, inducing a draft in said second and lower zone by withdrawing gases therefrom substantially below said first zone in flow separated from the flow in said first zone.

11. The method of recovering chemicals from black liquor that is produced in the pulping of cellulosic materials by the calcium base sulphite process which comprises creating in a furnace an introductory upper zone at a temperature between 500° C. and 850° C. and a second and lower zone in direct communication therewith of from 850° C. to 1500° C., evaporating the water out of the black liquor and flowing the dried solids along with air to support combustion downwardly into the upper zone to ignite the organic matter and effect the reaction of the calcium compounds, and without encountering induced upward draft, continuing the flow into the second and lower zone where the reaction between calcium sulphide and sulphur dioxide is effected to produce calcium oxide and other products, inducing a draft from the second and lower zone by withdrawing gases therefrom substantially below said first zone in flow separated from the flow in said first zone.

12. The method as in claim 11 which includes also the introduction of sulphur dioxide gas into the second and lower zone in an amount required to complete the reaction therein of the calcium sulphide to produce calcium oxide and other products.

13. The method as in claim 11 which includes also the introduction of sulphur dioxide gas into the second and lower zone in an amount required to complete the reaction therein of the calcium sulphide to produce calcium oxide and other products, and the introduction of air sufficient to burn any residual sulphur to sulphur dioxide.

14. The method of recovering chemicals from the black liquor that is produced in the pulping of cellulosic material by the sulphite pulp process, comprising flowing the dispersed black liquor and air into an introductory furnace zone maintained at a temperature and atmosphere to evaporate the water from the liquor and to ignite the organic matter and effect the reaction of the ligno-sulphonates of the chemical base used in the process, continuing the flow into a second furnace zone maintained at a higher temperature of reaction and atmosphere such that the reaction between the sulphide of the chemical base used and sulphur dioxide is effected to produce the oxide of the chemical base used and other products and inducing a draft in the second zone by withdrawing gases therefrom in flow separated from the flow in said first furnace zone.

15. The method of recovering chemicals from black liquor that is produced in the pulping of cellulosic materials by the sulphite pulp process comprising evaporating the water from the black liquor to produce substantially dry solids, flowing the dried solids along with air to support combustion into a furnace zone maintained at a temperature not above 850° C. to ignite the organic matter and effect the reaction of the ligno-sulphonates of the chemical base used in the process, continuing the flow into a second furnace zone maintained at a higher temperature of reaction such that the reaction between the sulphide of the chemical base used and sulphur dioxide is effected to produce the oxide of the chemical base used and other products and inducing a draft therefrom in flow separated from the flow in said first furnace zone.

HERMAN N. SIMPSON.

REFERENCES CITED

The following references are of record in the file of this patent:

UNITED STATES PATENTS

| Number | Name | Date |
|---|---|---|
| 1,931,536 | Goodell | Oct. 24, 1933 |
| 2,056,266 | Goodell | Oct. 6, 1936 |
| 2,179,456 | Tomlinson et al. | Nov. 7, 1939 |
| 2,213,052 | Rosencrants et al. | Aug. 27, 1940 |
| 2,258,467 | Owens | Oct. 7, 1941 |
| 2,261,995 | Greenawalt | Nov. 11, 1941 |
| 2,285,876 | Tomlinson | June 9, 1942 |
| 2,416,462 | Wilcoxson | Feb. 25, 1947 |